United States Patent Office 3,663,520
Patented May 16, 1972

3,663,520
PROCESS FOR SUSPENSION POLYMERIZATION OF VINYL CHLORIDE
Thomas Balwe, Johann Bauer, and Kurt Fendel, Burghausen, Upper Bavaria, Germany, assignors to Wacker-Chemie G.m.b.H., Munich, Germany
No Drawing. Filed Apr. 1, 1969, Ser. No. 812,290
Claims priority, application Germany, Apr. 2, 1968, P 17 70 113.2
Int. Cl. C08f *1/11, 3/30, 1/88*
U.S. Cl. 260—87.5 R                    1 Claim

ABSTRACT OF THE DISCLOSURE

An improvement in the suspension polymerization of a polymerizate containing at least 50% polyvinyl chloride by the steps of mixing (1) monomers selected from the group consisting of vinyl chloride and mixtures of vinyl chloride with up to 50% of olefinically unsaturated compounds copolymerizable with vinyl chloride, (2) a polymerization catalyst, (3) suspension stabilizers including protective colloids, and (4) water, heating said mixture under continuous agitation to polymerization temperatures and recovering said polymerizate. The improvement comprises mixing the monomers with water prior to the addition of the suspension stabilizers including protective colloids. The so-prepared polymerizates require less suspension stabilizers including protective colloids to attain the same size distribution as in the case where the monomer is mixed with water in the presence of the suspension stabilizers including protective colloids.

THE PRIOR ART

The process of suspension polymerization, sometimes known as "pearl polymerization," of vinyl chloride has been known for a long time. This process involves the polymerization or copolymerization of vinyl chloride in an aqueous dispersion in the presence of suspension stabilizers using monomer-soluble catalysts, under agitation sufficient to suspend the monomer droplets and polymerizates. The dispersing agents utilized are mainly protective colloids which may be utilized in admixture with other dispersing agents. The polymerizates so obtained settle rapidly after the agitation, utilized prior or during the polymerization to effect the formation or the maintenance of the dispersion, has stopped.

According to all the known directions for the sequence of the addition of the ingredients of the polymerization recipe for the suspension polymerization of vinyl chloride, where the polymerization recipe contains, prior to the polymerization, protective colloids, the protective colloids are added to the water before the vinyl chloride was dispersed in the water. (See, for example, De Bell et al., "German Plastics Practice," Springfield, Mass., 1946, page 69, or German Patent 1,081,672.) The general method is to disperse the dispersing agents in the water, before starting to disperse the ingredient which has to be dispersed in the water. To prove this, one has to remember the process of washing in a household. Further, the expert would be expected not to add vinyl chloride to the polymerization recipe except as the last ingredient, because of the pressure created by the vinyl chloride in the polymerization container.

OBJECTS OF THE INVENTION

An object of the present invention is, in the suspension polymerization process for the production of polymerizates containing at least 50% polyvinyl chloride which comprises the steps of mixing (1) monomers selected from the group consisting of vinyl chloride and mixtures of vinyl chloride with up to 50% of olefinically unsaturated compounds copolymerizable with vinyl chloride, (2) a polymerization catalyst, (3) suspension stabilizers including protective colloids, and (4) water, heating said mixture under continuous agitation at polymerization temperatures and recovering said polymerizates, the improvement which consists in mixing said monomers with said water prior to the addition of said suspension stabilizers including protective colloids.

These and other objects of the present invention will become more apparent as the description thereof proceeds.

DESCRIPTION OF THE INVENTION

It has now been discovered that improved results may be attained in the known process for the suspension polymerization of vinyl chloride where the polymerization recipe contains, prior to the beginning of the polymerization, protective colloids, which invention is characterized in that the total amount of vinyl chloride or mixtures of vinyl chloride with monomers copolymerizable with vinyl chloride are dispersed in the water, prior to the addition of the protective colloids and, if required, the other employed dispersing agents.

The advantages achieved by the above-mentioned method are surprising, since one would assume that it would be without consequence, upon dispersing the monomers in the water by agitation of the mixture, whether the dispersing agents cause at once or later the formation of small drops of the monomers, and since thus far one assumed, that the presence of dispersing agents was only necessary after a 20 to 30% conversion of the monomers by the polymerization. (See, for example, L. Kuechler, "Polymerizationkinetik," Berlin, 1951, page 211.)

Because of the change introduced by the invention, lesser amounts of protective colloids and other dispersing agents may be employed as previously in the suspension polymerization of vinyl chloride for the achievement of finely divided polymerizates. This, aside from the lower costs of the protective colloids, has the advantage that the creation of undesirable foam is considerably lessened both during the polymerization and during the working up of the polymerizate achieved by the polymerization, namely, the distilling of the unconverted monomers. More advantageous, more finely divided polymerizates are obtained upon using equal amounts of protective colloids as previously employed in the suspension polymerization of vinyl chloride.

The process of the invention, other than the addition of the monomers to the water prior to the addition of the suspension stabilizers including protective colloids, is conducted under normal suspension polymerization conditions for the polymerization of vinyl chloride. All monomers, which are copolymerizable with the vinyl chloride in known manner, can be employed together with vinyl chloride according to the process of the invention. These monomers copolymerizable with vinyl chloride are olefinically unsaturated and are employed, if desired, in amounts of from 3% to 50% by weight, preferably from 10% to 40% by weight, of the monomer mixture, together with the vinyl chloride.

Examples of olefinically unsaturated compounds copolymerizable with vinyl chloride are, for example, vinyl esters of alkanoic acids having from 2 to 18 carbon atoms, such as vinyl acetate, vinyl propionate, vinyl laurate, vinyl esters of saturated monocarboxylic acids having 9 to 11 carbon atoms which are aliphatic, in the alpha position with regard to the branched carboxyl group, and vinyl esters of commercial mixtures of branched, aliphatic, saturated monocarboxylic acids having 13 carbon atoms where more than 50% of the carbon atoms in alpha position to the carboxyl group are secondary carbon atoms, for example, the vinyl ester of "isotridecanoic acid"; alkyl esters of acrylic and methacrylic acid, such as 2-ethylhexyl acrylate and 2-ethylhexyl methacrylate; vinyl ethers of alkanols, such as vinyl-n-butyl ether; monoalkyl and dialkyl esters of alkendioic acids such as mono-(2-ethylhexyl)-maleate, and mono-(2-ethylhexyl)-fumarate, di-(2-ethylhexyl)-maleate, di - (2 - ethylhexyl) - fumarate; mixed esters of alkanols and alkenols with alkendioic acids; such as the fumaric acid ester of a mixture of alkanols having from 14 to 20 carbon atoms and oleyl alcohol; alkenes, such as ethylene; alkadienes, such as butadiene; phenylalkenes, such as styrene; and alkendioic acids, such as maleic acid. Of particular importance in the invention is the mixed polymerization of vinyl chloride with vinyl acetate. Obviously, according to the process of the invention mixed polymerizates, of more than two monomers, can also be produced, for example, the mixed polymerizates of 86% by weight of vinyl chloride, 13% by weight of vinyl acetate and 1% by weight of maleic acid. If the process of the invention is to be applied to the mixed copolymerization of vinyl chloride, the total amount of monomers to be copolymerized with the vinyl chloride, in the total weight of vinyl chloride and the monomers to be copolymerized therewith, is preferably from 3% to 50%, in particular 10% to 40% by weight.

As suspension stabilizers including protective colloids, those generally employed in the suspension polymerization of vinyl chloride can be used. These suspension stabilizers, however, always include protective colloids.

All protective colloids usually employed in the suspension polymerization of vinyl chloride, may be employed within the scope of the present invention. These protective colloids are, for example, polyvinyl alcohols which can contain, if desired, up to 40 mol percent of acetyl groups; gelatin; polyvinylpyrrolidine; cellulose ether derivatives particularly of a water-soluble nature, such as water-soluble methyl cellulose, carboxymethyl cellulose, hydroxyethyl cellulose, hydroxyethylmethyl cellulose and hydroxypropylmethyl cellulose, as well as water-soluble salts, particularly ammonium salts, of copolymers of maleic acid or its monoalkyl esters with styrene or vinyl acetate or vinyl esters of saturated branched carboxylic acids. Mixtures of various protective colloids may also be employed.

The protective colloids are preferably utilized in amounts of from 0.01% to 1% by weight, particularly from 0.05% to 0.2% by weight, based on the weight of vinyl chloride or mixed monomers. Excellent results are achieved by the process of the invention where from ⅓ to ⅕ of the previously employed amounts of protective colloids, are employed.

In addition to the protective colloids, other suspension stabilizers or dispersing agents may be utilized in the process of the invention. These dispersing agents may be anionic, cationic, amphoteric and/or non-ionic emulsifiers. Examples of anionic emulsifiers are the following: alkali metal salts, especially the sodium and potassium salts, as well as ammonium and alkaline earth metal salts, particularly the calcium salts; of long chain fatty acids or higher alkanoic acids, such as lauric acid, stearic acid and isotridencanoic acid; of high unsaturated aliphatic hydrocarbon monocarboxylic acids, such as oleic acid; of rosin acids, such as abietic acid; of acid fatty alcohol sulfuric acid esters, such as the acid sulfuric acid ester of lauryl alcohol; of hydrocarbon sulfonic acids, such as alkylsulfonic acids available in commerce under the mark "Mersilates"; of alkylnaphthalene sulfonic acids; and of sulfosuccinic acid dialkyl esters such as sodium diethylhexyl sulfosuccinate.

Cationic emulsifiers may also be used, such as hydroxyethyl dodecyl dimethyl ammonium chloride as well as amphoteric emulsifiers such as dodecyl betaine.

Examples of non-ionic emulsifiers are partial fatty acid esters of polyvalent alcohols, such as glycerin monostearate, sorbitol monolaurate, or sorbitol monopalmitate; partial ethers of higher fatty alcohols and polyvalent alcohols; polyoxyethylene esters of fatty acids; polyoxyethylene ethers of fatty alcohols and alkylphenols; as well as the polypropylene oxide-polyethylene oxide block polymer sold under the trade name "Pluronics."

In the event anionic, cationic, amphoteric and/or non-ionic emulsifiers are employed in addition to the protective colloids, they are employed in amounts of at least 0.001% by weight, based on the amount of water utilized in the polymerization recipe, but not more than the amount of protective colloids utilized.

All polymerization catalysts, which can be used for the suspension polymerization of vinyl chloride, can be used according to the present invention. As catalysts are, for example, molecular oxygen; monomer-soluble polymerization catalysts, such as diacylperoxides, for example, diacetylperoxide, didecanoylperoxide, acetobenzoylperoxide, dilauroylperoxide, dibenzoylperoxide, and bis-2,4-dichlorobenzoylperoxide; dialkylperoxides, for example, di-tert.-butylperoxide; percarbonates, for example, diisopropyl-peroxydicarbonate and di-(2-ethylhexyl)percarbonate; percarboxylic acid esters, such as tert.-butyl perpivalate and tert.-butylperethoxyacetate; mixed anhydrides of organic sulfoper acids with carboxylic acids, such as acetylcyclohexanesulfonylperoxide; as well as polymerization catalysts known as azo compounds, such as azodiisobutyric acid dinitrile. Mixtures of the above catalysts can also be employed. If need be combinations of monomer-soluble catalysts with water-soluble polymerization catalysts, such as hydrogen peroxide and potassium persulfate can be employed. The catalysts are employed in the usual amounts for the suspension polymerization of vinyl chloride. These amounts are generally 0.00005% to 3% by weight, mostly 0.001% to 0.3% by weight, based on the weight of the vinyl chloride or mixed monomers.

The ratio of water to monomer in the process of the invention is not critical. In general, the amount of monomer is from 10% to 60%, particularly from 20% to 50%, of the total weight of water and monomer. Preferably, the water is purified by ion-exchange or by distillation before using. The water utilized should also be freed of dissolved gases before being charged in the polymerization vessel.

In addition to the polymerization ingredients already mentioned, other ingredients normally employed in the suspension polymerization of vinyl chloride may also be utilized in the process of the invention, such as particle size regulators, for example, inorganic salts, such as calcium chloride or sodium sulfate; buffer compounds, such as sodium bicarbonate or calcium carbonate; and molecule size regulators, such as trichloroethylene.

It is advisable to use, as a container for the preparation of the polymerization recipe and for the polymerization, a stainless steel vessel or a pressure vessel which is covered with an acid resistant enamel and which at the same time is furnished with an agitator. Preferable is a mixer manufactured by the firm "Pfaudler-Werke AG." Schwetzingen (Germany), described in the "Pfaudler Catalogue for Chemical Apparatus" as "114–7/63566" or "Impeller Stirrer." This "Impeller Stirrer" is a three-wing stirrer, where the wings consist of closed, flattened pipes. Preferably during the preparation of the polymerization recipe and during the polymerization, the mixer is operated at from 50 to 200 r.p.m., particularly from 60 to 150 r.p.m. It has been proven to be expedient to maintain the same rate of agitation both during the preparation of the polymerization recipe and during the actual polymerization process.

Two to ten minutes are sufficient in order to effect the dispersion of the total amount of vinyl chloride or the mixture of monomers copolymerizable with vinyl chloride with the water, prior to the addition of the remainder of the polymerization recipe, particularly the protective colloids, and the other dispersing agents optionally employed. Longer periods may be employed. However, they do not yield any additional advantages. Preferably, the other constituents of the polymerization recipe which are required, in addition to the vinyl chloride, or the mixture of copolymerizable monomers with vinyl chloride, are added to the water or therein dispersed, also prior to the addition of the suspension stabilizers including protective colloids. These are, in particular, inorganic auxiliaries such as inorganic salts and buffer ingredients; catalysts, if utilized; molecule-size regulators, which may also be catalysts analogous to German Patent No. 1,081,672, etc.

The protective colloids, and the other dispersing agents, are only added after the addition of one or more monomers to the polymerization recipe according to the invention. It is expedient because of the high superatmospheric pressure existing in the pressure vessel after the addition of vinyl chloride into the pressure vessel, to pump the protective colloids and, if need be, the also other utilized dispersing agent, into the pressure vessel in the form of an aqueous solution. For example, aqueous solutions with a content of 3% to 5% by weight with reference to the weight of these solutions are pumped into the pressure vessel.

After preparing the polymerization recipe, the polymerization is effected under the conditions of pH-values, preferably 2 to 10, and temperatures, preferably 30° C. to 80° C., known for the suspension polymerization of vinyl chloride.

A pressure vessel covered with an acid-resistant enamel (autoclave) furnished with a three-wing stirrer, whose wings consist of closed, flattened pipes, and a baffle, is used in the following examples as a container for the preparation of the polymerization recipe and for the polymerization. All parts are parts by weight.

The following examples are illustrative of the practice of the invention. They are not, however, to be deemed limitative in any respect.

EXAMPLE 1

(a) First, 163 parts of water previously purified by ion exchange were charged into the open autoclave. Then, 0.03 part of sodium bicarbonate and 0.1 part of dilauroyl peroxide were added in the sequence named. The autoclave was then closed and the stirrer was started. The stirrer was operated at 150 r.p.m. from this point until the end of the polymerization. Thereafter, air was evacuated from the autoclave to give an internal pressure of about 0.1 atm. 100 parts of vinyl chloride were then pumped into the autoclave.

Ten minutes after the addition of the vinyl chloride, a 3% by weight aqueous solution containing 0.4 part of hydroxypropylmethyl cellulose with a viscosity of 100 cp., measured in a 2% by weight aqueous solution at 20° C., was pumped into the autoclave by a dosing pump. The contents of the autoclave were then heated to 59° C. and this temperature was maintained for 12 hours. At this time, 85% of the monomer had polymerized. After distillation of the unconverted monomer, the polymerizate obtained was separated from the aqueous phase of the polymerization mixture by centrifuging and thereafter dried.

A screen analysis of the polyvinyl chloride thus obtained gave the following results:

| Sieve openings mm.: | Residue weight percent |
| --- | --- |
| 0.2 | 0 |
| 0.15 | 0 |
| 0.10 | 0 |
| 0.06 | 52 |
| <0.06 | 48 |

(b) As a comparison, the above-mentioned method was repeated with the sole change that the sequence of the adding of the components of the polymerization recipe was employed as had previously been followed.

First of all, water purified by ion exchange, hydroxypropylmethyl cellulose, sodium carbonate and dilauroyl-peroxide were charged into the opened autoclave. Then the autoclave was closed; the mixer was started, and from now until the end of the polymerization, the mixer was operated at 150 r.p.m. After the evacuation of the air, so that the pressure in the autoclave now amounted to about 0.1 atm., vinyl chloride was charged into the autoclave.

After polymerization and working up the polymerizate as in (a) above, the following sieve analysis was obtained:

| Sieve openings mm.: | Residue weight percent |
| --- | --- |
| 0.2 | 22 |
| 0.15 | 15 |
| 0.10 | 18 |
| 0.06 | 20 |
| <0.06 | 25 |

EXAMPLE 2

($a_1$) First, 170 parts of water previously purified by ion exchange and 0.08 part of dilauroyl peroxide were charged into the open autoclave. The autoclave was then closed and the stirrer was started. The stirrer was operated at 60 r.p.m. from this point until the end of the polymerization. Thereafter, air was evacuated from the autoclave to give an internal pressure of about 0.1 atm. 1.1 parts of trichloroethylene, 15 parts of vinyl acetate and 85 parts of vinyl chloride were then pumped into the autoclave in the above sequence.

Ten minutes after the addition of the monomers, a 3% by weight aqueous solution containing 0.2 parts of hydroxyethyl cellulose with a viscosity of 20 cp., measured in a 2% by weight aqueous solution at 20° C., was pumped into the autoclave by a dosing pump. The contents of the autoclave were then heated to 64° C. and this temperature was maintained for 15 hours. At this time, 90% of the monomers had polymerized. After distillation of the unconverted monomer, the polymerizate obtained was separated from the aqueous phase of the polymerization mixture by centrifuging and thereafter dried.

A screen analysis of the polymerizate thus obtained gave the following results:

| Sieve openings mm.: | Residue weight percent |
| --- | --- |
| 0.30 | 0 |
| 0.25 | 0 |
| 0.15 | 4 |
| 0.10 | 17 |
| 0.06 | 60 |
| <0.06 | 19 |

($a_2$) The working method described under ($a_1$) was repeated with the modification that not 0.2 parts but only 0.06 part of hydroxyethyl cellulose were utilized. Because of the lower amount of protective colloids employed, the mixture obtained on the polymerization foamed only insignificantly when the unconverted monomers were distilled off.

| Sieve openings mm.: | Residue weight percent |
| --- | --- |
| 0.30 | 1 |
| 0.25 | 3 |
| 0.15 | 45 |
| 0.10 | 28 |
| 0.06 | 17 |
| <0.06 | 6 |

(b) As a comparison, the above-mentioned method as described in ($a_1$) was repeated with the sole change that the sequence of the adding of the components of the polymerization recipe was employed as had previously been followed.

First of all, water purified by ionic exchange, hydroxyethyl cellulose, and dilauroyl peroxide were charged into the opened autoclave. Then the autoclave was closed. The mixer was started and from now to the end of the polymerization, the mixer was operated at 60 r.p.m. After the evacuation of the air, so that the pressure in the autoclave now amounted to about 0.1 atm., trichloroethylene, vinyl acetate and finally vinyl chloride were charged into the autoclave.

After working up the polymerizate as in ($a_1$) above, the following sieve analysis was obtained:

| Sieve openings mm.: | Residue weight percent |
|---|---|
| 0.30 | 0.5 |
| 0.25 | 1.5 |
| 0.15 | 46 |
| 0.10 | 22 |
| 0.06 | 18 |
| <0.06 | 12 |

These results demonstrate that the order of addition of the polymerization recipe components of the invention enables the use of only 30% of the suspension stabilizers including protective colloids required under the previous sequence of addition of components, to obtain the same size distribution of the polymerizate.

EXAMPLE 3

($a_1$) The working method described under Example 2 ($a_1$) was repeated with the modifications that 0.05 part of calcium carbonate were added to the water prior to the addition of the peroxide, and that instead of 0.2 part of hydroxyethyl cellulose, 0.45 part of polyvinyl alcohol with residual acetyl groups, having the saponification number (mg. KOH, required for the saponification and neutralization of the remaining acetyl groups in 1 gm. of polyvinyl alcohol) of 190 and a viscosity of 25 cp., measured in a 4% aqueous solution at 20° C., were employed. The sieve analysis of the polymerizate obtained was the following:

| Sieve openings mm.: | Residue weight percent |
|---|---|
| 0.30 | 0 |
| 0.25 | 0 |
| 0.15 | 0 |
| 0.10 | 1 |
| 0.06 | 39 |
| <0.06 | 60 |

($a_2$) The working method described under ($a_1$) above was repeated with the modification that not 0.45 part, but only 0.16 part of polyvinyl alcohol were utilized. Because of the lower amount of protective colloids employed, the mixture obtained by the polymerization did not foam excessively upon distillation of the unconverted monomers. The complete distillation was achieved within one hour.

| Sieve openings mm.: | Residue weight percent |
|---|---|
| 0.30 | 4 |
| 0.25 | 4 |
| 0.15 | 22 |
| 0.10 | 18 |
| 0.06 | 41 |
| <0.06 | 11 |

(b) As a comparison, the above-mentioned method as described under ($a_1$) was repeated with the single modification that the sequence of the addition of ingredients of the polymerization recipe was employed as had been previously followed.

First, water purified by ion exchange, polyvinyl alcohol, calcium carbonate and dilauroylperoxide were charged into the opened autoclave. Then the autoclave was closed. The mixer was started, and from now until the end of the polymerization, the mixer was operated at 60 r.p.m. After the evacuation of the air, so that the pressure in the autoclave now amounted to about 0.1 atm., trichloroethylene, vinyl acetate and finally vinyl chloride were charged. Because of the greater amount of protective colloids utilized, the mixture obtained by the polymerization foamed excessively upon distillation of the unconverted monomers. The complete distillation required a time of 3 hours.

Sieve analysis:

| Sieve openings mm.: | Residue weight percent |
|---|---|
| 0.30 | 6 |
| 0.25 | 7 |
| 0.15 | 48 |
| 0.10 | 23 |
| 0.06 | 10 |
| <0.06 | 6 |

EXAMPLE 4

(a) First, 194 parts of water previously purified in ion exchange were charged into the open autoclave. Then 0.06 part of calcium carbonate and 0.07 part of dilauroylperoxide were added in the sequence named. The autoclave was then closed and the stirrer was started. The stirrer was operated at 60 r.p.m. from this point until the end of the polymerization. Thereafter, air was evacuated from the autoclave to give an internal pressure of about 0.1 atm. 42 parts of vinyl acetate, then 58 parts of vinyl chloride were then pumped into the autoclave in the sequence named.

Ten minutes after the addition of the monomers, a 3% weight aqueous solution containing 0.1 part of polyvinyl alcohol with residual acetyl groups, having a saponification number of 140 and a viscosity of 25 cp., measured in a 4% by weight aqueous solution at 20° C., and thereafter 0.005 part of sodium lauryl sulfate also in a 3% by weight aqueous solution were pumped into the autoclave by a dosing pump. The contents of the autoclave were then heated to 64° C. and this temperature was maintained for 15 hours. At this time, 90% of the monomers had polymerized. After distillation of the unconverted monomer, the polymerizate obtained was separated from the aqueous phase of the polymerization mixture by centrifuging and thereafter dried, similar as in Example 1.

Because of the lower amount of protective colloids and other dispersing agents utilized, the mixture obtained by the polymerization did not foam excessively when the unconverted monomers were distilled off.

A screen analysis of the polymerizate thus obtained gave the following results:

| Sieve openings mm.: | Residue weight percent |
|---|---|
| 0.30 | 1 |
| 0.25 | 3 |
| 0.15 | 7 |
| 0.10 | 16 |
| 0.06 | 38 |
| <0.06 | 35 |

(b) As a comparison, the above-mentioned method was repeated with the modification that the sequence of the adding of the components of the polymerization recipe was employed as had previously been follwed, together with the modification, for the purposes of obtaining finely divided polymerizates, that larger amounts of from 250% to 500% of the dispersing agents utilized under (a) above were utilized.

First of all, water purified by ion exchange, 0.25 part of polyvinyl alcohol, rather than 0.1 part, 0.025 part of sodium lauryl sulfate, rather than 0.005 part, calcium carbonate and dilauroylperoxide were charged into the opened autoclave. Then the autoclave was closed, the mixer was started and from now to the end of the polymerization, the mixer was operated at 60 r.p.m. After the evacuation of the air, so that the pressure in the autoclave now amounted to about 0.1 atm., vinyl acetate, then vinyl chloride was charged into the autoclave.

Because of the greater amount of dispersing agents utilized, the mixture obtained by the polymerization foamed very strongly when the unconverted monomers were distilled off.

After polymerization and working up the polymerizate as in (a) above, the following sieve analysis was obtained:

| Sieve openings mm.: | Residue weight percent |
|---|---|
| 0.30 | 1 |
| 0.25 | 1 |
| 0.15 | 11 |
| 0.10 | 36 |
| 0.06 | 31 |
| <0.06 | 20 |

The preceding specific embodiments are illustrative of the practice of the invention. It is to be understood however, that other expedients known to those skilled in the art may be employed without departing from the spirit of the invention.

We claim:

1. In the suspension polymerization process for the production of polymerizates containing at least 50% polyvinyl chloride which comprises the steps of mixing prior to the beginning of the polymerization (1) monomers selected from group consisting of vinyl chloride and mixtures of vinyl chloride with up to 50% of olefinically unsaturated compounds copolymerizable with vinyl chloride, (2) a polymerization catalyst, (3) suspension stabilizers including protective colloids, and (4) water, subsequently heating said mixture under continuous agitation at polymerization temperatures of from 30° C. to 80° C. without further addition of polymerization ingredients, and recovering said polymerizates, the improvement which consists in mixing said monomers with said water prior to the addition of said suspension stabilizers including protective colloids.

References Cited

UNITED STATES PATENTS 3,258,453  6/1966  Chi _____ 260—92.8 W

JOSEPH L. SCHOTER, Primary Examiner

J. A. DONAHUE, JR., Assistant Examiner

U.S. Cl. X.R.

260—78.5 Cl, 86.3, 87.1, 87.5 C, 87.5 G, 92.8 W